United States Patent [19]

Yoshioka et al.

[11] 3,800,265

[45] Mar. 26, 1974

[54] ACTIVE TYPE GROUP-DELAY EQUALIZER

[75] Inventors: Takeshi Yoshioka; Susumu Akiyama, both of Tokyo, Japan

[73] Assignee: Nippon Electric Company Limited, Tokyo, Japan

[22] Filed: May 18, 1972

[21] Appl. No.: 254,517

[30] Foreign Application Priority Data

May 20, 1971 Japan .............................. 46-34559

[52] U.S. Cl. ............... 333/28 R, 307/262, 307/295, 330/31

[51] Int. Cl. .............................................. H03h 7/14

[58] Field of Search ......... 333/28 R, 80 T; 307/232, 307/262, 264, 295; 330/21, 31, 94

[56] References Cited

UNITED STATES PATENTS 3,581,122 5/1971 Gaunt, Jr. ............................ 333/28

FOREIGN PATENTS OR APPLICATIONS 1,447,355 6/1966 France .............................. 307/262

*Primary Examiner*—Paul L. Gensler

*Attorney, Agent, or Firm*—Sughrue, Rothwell, Mion, Zinn & Macpeak

[57] ABSTRACT

An improved active type group-delay equalizer having the transfer function $$N = (AZ_b + AZ_a + B/CZ_b - DZ_a + E)$$

where $A$, $B$ and $D$ are functions of $Z_1$ and $Z_2$ for a given $AZ_a$ and $Z_b$ such that $|N|=$ constant. Additional reduction in amplitude distortion is realized by selecting both $Z_a$ and $Z_b$ to have a reactive component.

14 Claims, 10 Drawing Figures

FIG. 6
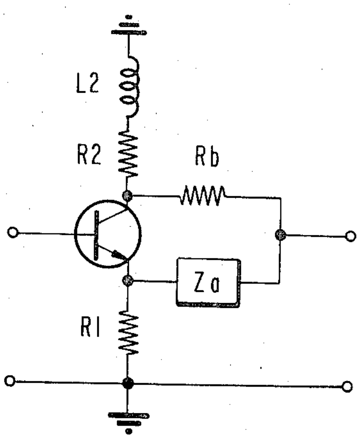
FIG. 7
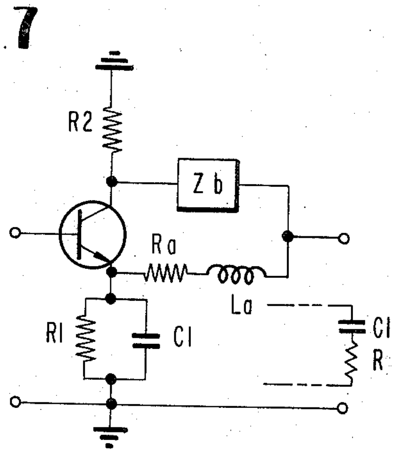
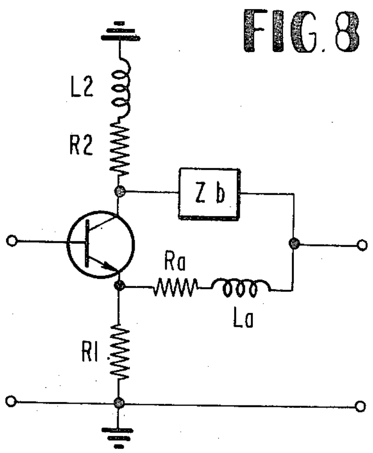
FIG. 9
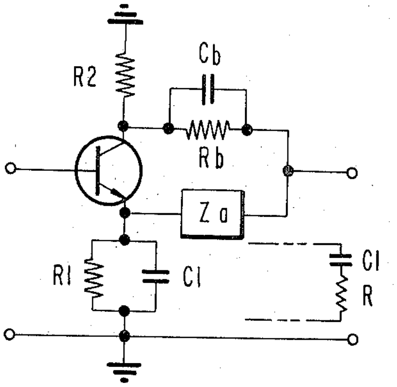
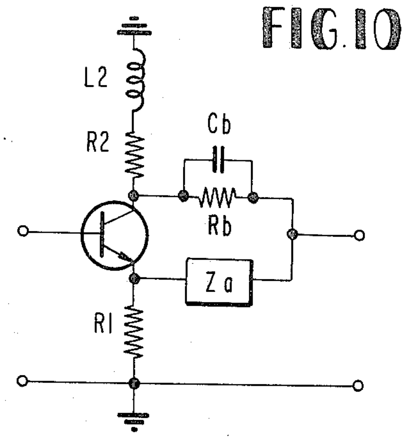

ACTIVE TYPE GROUP-DELAY EQUALIZER

This invention relates to an active type group-relay equalizer having amplitude distortion compensating elements.

In the waveform transmission of a data signal, a television signal, etc., the amplitude and group delay time must be constant irrespective of frequency band, to avoid waveform distortion. For this purpose, group-delay equalizers having a constant amplitude characteristic are employed. Heretofore, all-pass networks using active elements have been used as the group-delay equalizer. This is because of the fact that circuit parameters of the element can be readily realized as compared to the all-pass networks of the symmetrical lattice type or modified bridged-T type, and that it is possible to vary the group-delay time. Conventional circuits have, however, had an inherent drawback in that amplitude distortion is caused by the capacitance inherently appearing between the collector and base of a transistor employed.

An object of the invention is to provide an active type group-delay equalizer, which is free from the above drawback, and with which it is possible to obtain reduced amplitude distortion even by using relatively less expensive transistors of inferior characteristics.

The invention will now be described in detail in connection with the accompanying drawings, in which:

FIGS. 3 to 10 are circuit diagram showing respective embodiments of the invention.

Figure 1:
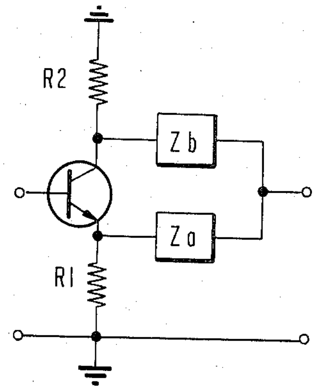
FIG. 1 PRIOR ART
FIG. 1 is a circuit diagram showing a basic circuit construction of a prior-art group-delay equalizer.

Referring to FIG. 1, resistors $R_1$ and $R_2$ of an equal resistance are connected to the emitter and collector of a transistor. Also, impedance elements $Z_a$ and $Z_b$ are provided. $Z_b$ should be resistive, when $Z_a$ is reactive and, conversely, $Z_b$ should be reactive when $Z_a$ is resistive. This conventional equalizer is discussed in detail in the following papers:

1. R.W. Colfee: "An active network equivalent to the constant-resistance lattice with delay circuit applications", IEEE Trans., Circuit Theory, Vol. CT-10, pp. 532 – 533 December 1963;
2. A.I. Larky: "An active all-pass network", IEEE Trans., Communication and Electronics, pp. 279 – 282 May 1963.

With this circuit, however, amplitude distortion is unavoidable because of the capacitance between the base and collector of the transistor. For example, with a transistor 2SC-251, and with $R_1 = R_2 = 300$ ohms, $Z_a = 750$ ohms, and $Z_b$ being constituted by a parallel circuit of a coil of inductance 2.4 microhenries and a capacitor of 1,400 picofarads, the amplitude distortion that results is about 1.6 dB (peak-to-peak value).

The principles of the invention will now be described with reference to FIG. 2. In the drawing, $Z_a$, $Z_b$, $Z_1$ and $Z_2$ represent respective impedance elements.

If a voltage $V_2$ appears across output terminal 2 and G (ground) with a voltage $V_1$ applied across input terminals 1 and G, the voltage transfer factor N is expressed as $$N = V_1/V_2 = (AZ_b + AZ_a + {}_B)/\ (CZ_b - DZ_a + E), \quad (1)$$

where coefficients $A$, $B$, $C$, $D$ and $E$ are given by the following equations:

$$A = 1 + (1/h_{21})\ [1 + h_{11}h_{22} + (h_{11}/Z_1) + h_{11}h_{22}(Z_2/Z_1) + h_{22}Z_2 - h_{12}] - h_{12}(Z_1 + Z_2)/Z_1$$

where $h_{11}$, $h_{12}$, $h_{21}$ and $h_{22}$ are $h$ parameters of the transistor. If the absolute value of negative terms in this equation is small so as to be negligible compared to the sum of the other terms, this equation can be reduced to:

$$A \approx 1 + (1/h_{21})\ [1 + H_{11}h_{22} + (h_{11}/Z_1) + h_{11}h_{22}(Z_2/Z_1) + h_{22}Z_2]$$

$$= 1 + \phi 1 \quad (2)$$

$$B = (1/h_{21})\ \{\ Z_2 + h_{11}\ [1 + (Z_{2/}Z_1)]\ \}\ ; \quad (3)$$

$$C = 1 + (1/h_{21})\ (1 + h_{22}Z_2) = 1 + \phi_2 \quad (4)$$

$$D = (Z_2/Z_1) - (h_{22}/h_{21})\ Z_2: \quad (5)$$

$$\text{and } E = Z_2/h_{21}; \quad (6)$$

Assuming that $Z_a$ is resistive and $Z_b$ is reactive, i.e., that $Z_a = R_a \not\approx 0$ and $Z_b = jX_b$, equation 1 is given by:

$$N = (jAX_b + AR_a + B)/(jCX_b - DR_a + E) = (A/C)\ .\ [jX_b + R_a + (B/A)/jX_b - (DR_a/C) + (E/C)],$$

and the condition to make |N| constant is given by:

$$R_a + (B/A) = (DR_a/C) - (E/C)$$

$$\text{or } A/C = (AR_a + B)/(DR_a - E) = m_1 \quad (7)$$

Combination of equation 7 and equation 1 gives $$N = m_1\ [jX_b + (DR_a - E)/C)]/[jX_b - (DR_a - E/C)] = m_1\ (jX_b + Z_{ao})/(jX_b - Z_{ao}) \quad (8)$$

where $Z_{ao} = (DR_a - E)/C$.

If $\phi_1 << 1$ and $\phi_2 << 1$, we have $$m_1 = A/C = (1 + \phi_1)/(1 + \phi_2) \approx 1 + \phi_1 - \phi_2 \quad (9)$$

$$\text{and } Z_{ao} = (DR_a - E)/C \approx (Z_2/Z_1)R_a\ [1 - (1/h_{21})\ \{\ 1 + h_{22}(Z_1 + Z_2) + (Z_1/R_a)\ \}\ ] \quad (10)$$

$$\text{Thus, } \phi_1 - \phi_2 = h_{11}\ /h_{21} \quad h_{22}\ [1 + (Z_2Z_1)] + (1/Z_1) << 1 \quad (11)$$

$$\text{Also, if } (1/h_{21})\ [1 + h_{22}\ (Z_1 + Z_2) + (Z_1/R_a)] << 1 \quad (12)$$

and $Z_1$ and $Z_2$ can be regarded as pure resistive, that is, if $Z_2 \approx R_2$ and $Z_1 \approx R_1$, $$N \approx [jX_b + (R_2/R_1)R_a]\ /\ [jX_b - (R_2R_1)\ R_a] \quad (13)$$

$$\text{Thus, } N \approx 1 \quad (14)$$

It will thus be seen that equation 7 represents the condition for obtaining a full pass band network of an extremely broad or virtually unlimited pass band. Now if $$B/R_a << 1 \text{ and}$$
$$(1/h_{21})\ [1 + 2h_{22}Z_2 + (2Z_2/R_a) + (h_{11}/R_a)] << 1, \} \quad (15)$$

from equation 7 we have $$Y_1 \approx Y_2\ \{1 + (1/h_{21})\ [1 + (2h_{11}/R_a)\ ]\ \} + (2/h_{21})\ [h_{22} + (1/R_a)] \quad (16)$$

where $Y_1 = 1/Z_1$ and $Y_2 = 1/Z_2$. Assuming that the base resistance and emitter resistance of the transistor are denoted by $r_B$ and $r_E$, the low frequency groundedemitter current gain by $\beta_0$, the capacitance of collector-base junction by $C_{ob}$ and the current-gain bandwidth angular frequency by $\omega_T$; $h_{11}$, $h_{21}$ and $h_{22}$ can be approximated as $$\left.\begin{aligned} h_{11} &\approx r_B + h_{21} r_E \\ h_{21} &\approx 1/[(1/\beta_0) + j(\omega/\omega_T)] \\ \text{and } h_{22} &\approx h_{21} \cdot j\omega C_{ob} \end{aligned}\right\} \quad (17)$$

Thus, if $Z_2$ is resistive given as $Z_2 = R_2$, and with $$(1/\beta_0)\ [1 + 2/R_a\ (r_B + \beta_0 r_E + R_2)] << 1 \quad (18)$$

equation 16 becomes $$Y_1 \doteqdot \frac{1}{R_2} \cdot \frac{1}{1 - \frac{1}{\beta_0}\left\{1 + \frac{2}{R_a}(r_B + \beta_0 r_E + R_2)\right\} + j\omega\left[2C_{ob} + \frac{1}{2\pi f_T}\left\{\frac{1}{R_2}\left(1 + \frac{2r_B}{R_a}\right) + \frac{2}{R_a}\right\}\right]} \quad (19)$$

where $f_T = \omega_T/2\pi$.

Thus, $Y_1$ can be expressed as $$Y_1 = (1/R_1) + j\omega C_1 \quad (20)$$

where $R_1 = R_2 [1 - (1/\beta_0)\{1 + (2/R_a)(r_B + \beta_0 r_E + R_2)\}]$
and $C_1 = 2C_{ob} + (1/2\pi f_T)\{(1/R_2)[1 + (2r_B/R_a)] + (2/R_a)\}$ (21)

Figure 3:
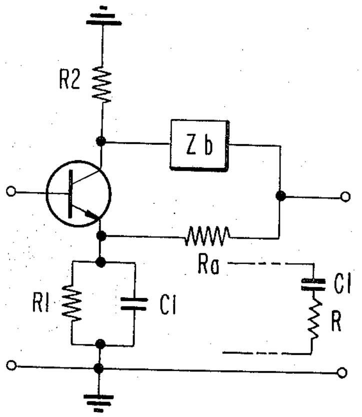

The circuit shown in FIG. 3 has reactance $Z_b = jX_b$ and resistance $R_a$ as the respective impedance elements and collector resistance $R_2$. If a parallel circuit of a resistor and a capacitor respectively having resistance $R_1$ and capacitance $C_1$ given in equations 21 is connected to the emitter of the transistor, equation 7 is satisfied and the full pass band network with reduced amplitude distortion can be realized.

In the above circuit, the compensating circuit consisting of a resistor and a capacitor is connected to the emitter side of the transistor. If the compensating circuit is connected to the collector side of the transistor with Z being purely resistive and given as $Z_1 = R_1$, and if the conditions $$(2R_1/h_{21})\ [h_{22} + (1/R_a)] << 1 \text{ and } (1/h_{21})\ [1 + (2h_{11}/R_a)] << 1 \quad (22)$$

hold, the solution of equation 16 for $Z_2 = 1/Y_2$ with the relation of equation 17 taken into consideration, lead us to the expression:

$$Z_2 \approx R_1\ [1 + (1/\beta_0)\{1 + (2/R_a)(r_B + R_1) + \beta_0 r_E\}] + j\omega R_1\ [(1/2\pi f_T)\{1 + (2/R_a)(r_B + R_1) + 2C_{ob}] \quad (23)$$

Thus, $Z_2$ can be expressed in the form $$Z_2 = R_2 + j\omega L_2 \quad (24)$$

where $R_2 = R_1 [1 + (1/\beta_0)\{1 + (2/R_a)(r_B + R_1 + \beta_0 r_E)\}]$
and $L_2 = R_1 [(1/2\pi f_T)\{1 + (2/R_a)(r_B + R_1) + 2C_{ob}]\}$ (25)

Figure 4:
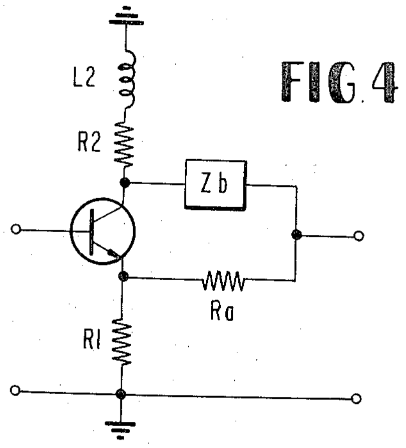

Accordingly, in the circuit of FIG. 4, which has reactance $Z_b = jX_b$ and resistance $R_a$ provided as the respective impedance elements and which has emitter resistance $R_1$, the connection to the collector of a series circuit of a resistor of resistance $R_2$ and an inductor of inductance $L_2$ given in equations 25 makes it possible to satisfy equation 7 and thus the full pass band network with reduced amplitude distortion can be realized.

Figure 2:
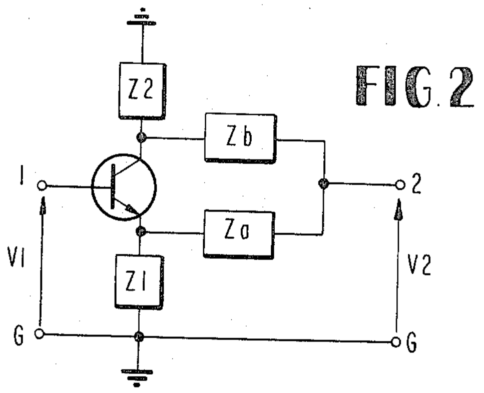
FIG. 2 shows the principal circuit of an active type group-delay equalizer according to the invention.

The foregoing discussion has been concerned with the case where $Z_b$ is reactive and $Z_a$ is resistive in FIG. 2. Now, the opposite case where $Z_b$ is resistive and $Z_a$ is reactive will be discussed.

In this case, $Z_a = jX_a$ and $Z_b = R_b \neq 0$ are substituted. By setting $$A/D = (AZ_b + B)/(CZ_b + E) = m_2 \quad (26)$$

from equation 1 we have $$N = m_2\,(CR_b + E)/[D + jX_a]/(CR_b + E)[/D - jX_a] = m_2 \cdot [(Z_{b0} + jX_a)/(Z_{b0} - jX_a)] \quad (27)$$

If $\phi_1 << 1$ and $(h_{22}/h_{21})Z_1 << 1$, we have $$m_2 = A/D \approx (Z_1/Z_2)\ [1 + (1/h_{21})\{1 + h_{11} h_{22}\ [(1 + (Z_2/Z_1)) + (h_{11}/Z_1) + h_{22}(Z_1 + Z_2)\}] \quad (28)$$

and $Z_{b0} = (CR_b + E)/D \approx (Z_1/Z_2)\, R_b\ [1 + (1/h_{21})\{1 + h_{22}\,(Z_1 + Z_2) + (Z_2/R_b)\}]$ (29)

Thus, $(1/h_{21})\{1 + h_{11}h_{22}\ [(1 + (Z_2/Z_1))] + (h_{11}/Z_1) + h_{22}(Z_1 + Z_2)\} << 1$ (30)

and $(1/h_{21})\{1 + h_{22}\,(Z_1 + Z_2) + (Z_2/R_b)\} << 1$ (31)

Also, if $Z_1$ and $Z_2$ can be regarded as purely resistive, that is, if $Z_1 = R_1$ and $Z_2 = R_2$, $$N \approx (R_1/R_2)\{[(R_1/R_2)\,R_b + jX_a]/(R_1/R_2)R_b - jX_a)\} \quad (32)$$

Thus, $|N| \approx$ a constant. (33)

It will thus be seen that equation 26 represents the condition for the full pass band network. Now, if $$(B/R_b) << 1,\ \phi_2 + (E/R_b) << 1,\ |(1/h_{21})\ [1 + 2h_{22}Z_2 - (h_{11}/R_b)]| << 1 \text{ and } (h_{11}/h_{21}R_b) << 1 \quad (34)$$

we have from equation 26

$$Y_1 \approx Y_2\ \{1 + (1/h_{21})\ [1 - (2h_{11}/R_b)]\} + (2h_{22}/h_{21}) \quad (35)$$

Thus, assuming that $Z_2$ is resistive, that, it is given as $Z_2 = R_2$, with $$(1/\beta_0)\ \{1 - (2/R_b)\ (r_B + \beta_0 r_E)\ \}| << 1 \quad (36)$$

the equations 35 and 17 give the following expression:

$$Y_1 = \frac{1}{R_2} \cdot \frac{1}{1 - \frac{1}{\beta_0}\left\{1 - \frac{2}{R_b}(r_B + \beta_0 r_E)\right\} + j\omega\left\{\frac{1}{2\pi f_T R_2}\left(1 - \frac{2r_B}{R_b}\right) + 2C_{ob}\right\}} \quad (37)$$

Thus, $Y_1$ can be expressed as $$Y_1 = (1/R_1) + j\omega C_1 \quad (38)$$

where $R_1 = R_2\ [\ 1 - (/\beta_0)\ \{1 - (2/R_b)\ (r_B + \beta_0 r_E)\}]$
and $C_1 = (1/2\pi f_T R_2)\ [1 - (2r_B/R_b)] + 2C_{ob}$ (39)

Figure 5:
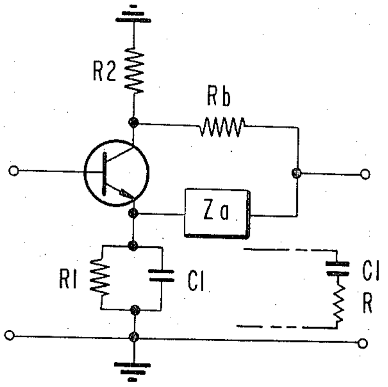

Accordingly, in the circuit of FIG. 5, which has reactance $Z_a = jX_a$ and resistance $R_b$ provided as the respective impedance elements and which has collector resistance $R_2$, the connection to the emitter of a parallel circuit of the resistor and the capacitor respectively of resistance $R_1$ and capacitance $C_1$ satisfying equations 39 leads us to satisfy equation 26 and thus to provide a full pass band network.

Now, if $Z_1$ is resistive, i.e. $Z_1 = R_1$, if the conditions $$(2h_{22}/h_{21})\ R_1 << 1 \text{ and } |(1/h_{21})\ [1-(2h_{11}/R_b)]| << 1 \quad (40)$$

are satisfied, the solution of equation 35 for $Z_2$ with the relation of equation 17 taken into consideration, gives:

$$Z_2 = R_1\ [1 + (1/\beta_0)\{1 - (2/R_b)\ (r_B + \beta_0 r_E)\}] + j\omega R_1\ \{(1/2\pi f_T)\ [1 - (2r_B/R_b)] + 2C_{ob}\} \quad (41)$$

Thus, $Z_2$ can be expressed by $$Z_2 = R_2 + j\omega L_2 \quad (42)$$

where $R_2 = R_1\ [1 + (1/\beta_0)\{1 - (2/R_b)(r_B + \beta_0 r_E)\}]$ and $L_2 = R_1\ \{(1/2\pi f_T)\ [1 - (2r_B/R_b)] + 2C_{ob}\}$ (43)

Accordingly, in the circuit of FIG. 6, which has the reactance $Z_a = jX_a$ and resistance $R_b$ provided as the respective impedance and which has emitter resistance $R_1$, the connection to the collector of a series circuit of resistor and inductor respectively of resistance $R_2$ and inductance $L_2$ satisfying equations 43 leads us to satisfy equation 26 and thereby to realize the full pass band network.

It will be noted that the compensating circuits discussed above can also compensate for the stray capacitances that can be replaced with equivalent capacitances appearing between the emitter and ground and between the collector and ground.

Where the parallel circuit of resistor and capacitor is connected to the emitter of the transistor as in the circuits of FIGS. 3 and 5 described above, the gain at extremely high frequencies beyond the operating frequency band becomes sometimes extremely high, affecting the stability of the circuit. To avoid this, a resistance R of such value as has no substantial effect on the compensating circuit for the operating frequency band may be connected in series with the capacitor of the compensating circuit connected to the emitter as shown in phantom lines in the figures.

Now, compensating circuits capable of further reducing the amplitude distortion when used in combination with the afore-described compensating circuits will be described.

First, it is assumed that $Z_b$ in the circuit of FIG. 2 is constituted by a reactance circuit. As will be described later, if $Z_{a0}$ in equation 10 can be equivalently constituted by a purely resistive element, the approximation of equation 12 becomes unnecessary. Thus, the amplitude distortion will be further reduced. Assuming also that $Z_a$ is constituted by a series circuit of resistance $R_a$ and inductance $L_a$, that is, if $$Z_a = R_a + j\omega L_a \quad (44)$$

equation 8 is reduced to $$N = m_1\ [jX_b + (DZ_a - E)/C\ ]/[jX_b - (DZ_a - E)/C\ ] = m(jX_b + Z_{a0})/(jX_b - Z_{a0}) \quad (45)$$

Also, similar to the derivation of equation 10, we have $Z_{a0}$ as $$Z_{a0} = (DZ_a - E)/C \approx (Z_2/Z_1)Z_a\ [1 - (1/h_{22})\{1 + h_{22}(Z_1 + Z_2) + (Z_1/Z_a)\}] \quad (46)$$

If $Z_1$ and $Z_2$ can be regarded as purely resistive (that is, if $Z_1 \approx R_1$ and $Z_2 \approx R_2$), the combination of equations 17 and 46 with the term of $\omega^2$ omitted, we obtain an approximated equation $$Z_{a0} \approx (R_2/R_1)R_a\{1 - (1/\beta_0)\ [1 + (R_1/R_a)\} + j\omega(R_2/R_1)\ [L_a[1 - (1/\beta_0)] - R_a\ \{(1/2\pi f_T) + C_{ob}\ (R_1 + R_2)\}\ R_1/2\pi f_T] \quad (47)$$

Thus, if $$L_a = C_{ob}R_a\ (R_1 + R_2) + (1/2\pi f_T)\ (R_a + R_1) \quad (48)$$

for $\beta_0 << 1$, $Z_{a0}$ can be approximated as $$Z_{a0} \approx (R_2/R_1)R_a\ \{1 - (1/\beta_0)\ [1 + (R_1/R_a)\} \quad (49)$$

which represents a pure resistance.

Accordingly, when $Z_b$ is reactive, the amplitude distortion can be further reduced by connecting inductance $L_a$ of equation 48 in series with $R_a$ in the circuit of FIG. 3 or 4, as shown in FIG. 7 or 8.

Description is now given as to the case where $Z_a$ in the FIG. 2 circuit is reactive. As in the above-described case, $Z_{b0}$ in equation 29 is replaced with an equivalent pure resistance. Assuming that $Z_b$ is composed if a parallel circuit of resistance $R_b$ and capacitance $C_b$ and that $\omega C_b R_b << 1$, we have $$Z_b = 1/[(1/R_b) + j\omega C_b] \approx R_b\ (1 - j\omega C_b R_b) \quad (50)$$

Thus, equation 27 is reduced to $$N = m_2\left\{\left(\frac{CZ_b + E}{D} + jX_a\right)\Big/\left(\frac{CZ_b + E}{D} - jX_a\right)\right\} = m_2\frac{Z_{b0} + jX_a}{Z_{b0} - jX_a} \quad (51)$$

As in the case of the derivation of equation 29, we obtain $$Z_{b0} = (CZ_b + E)/D = (Z_1/Z_2)Z_b\ [1 + (1/h_{21})\ \{1 + h_{22}\ (Z_1 + Z_2) + (Z_2/Z_b)\}] \quad (52)$$

If $Z_1$ and $Z_2$ can be regarded purely resistive (that is, if $Z_1 \approx R_1$ and $Z_2 \approx R_2$), by the combination of equation 17 with equation 52 with the term of $\omega^2$ omitted, we obtain an approximating equation $$Z_{b0} \approx (R_1/R_2)R_b\ \{1 + (1/\beta_0)\ [1 + (R_2/R_b)\} + j\omega\ [(R_1/R_2)R_b\ \{(1/2\pi f_T) + C_{ob}\ (R_1 + R_2) - C_b R_b\ [1 + (1/\beta_0)\} + (R_1/2\pi f_T)] \quad (53)$$

Thus, if $$C_b = (1/R_b)\ \{C_{ob}\ (R_1 + R_2) + (1/2\pi f_T)\ [1 + (R_2/R_b)\} \quad (54)$$

9 for $\beta_0 << 1$, $Z_{b0}$ in equation 53 can be reduced to $$Z_{b0} \approx (R_1/R_2)R_b\ \{1 + (1/\beta_0)\ [1 + (R_2/R_b]\} \quad (55)$$

where represents a pure resistance.

Accordingly, when $Z_a$ is reactive, the amplitude distortion can be further reduced by connecting capacitance $C_b$ of equation 54 in parallel with $R_b$ in the circuit of FIG. 5 or 6, as shown in FIG. 9 or 10. Usually, $L_a$ is extremely small compared to $R_a$, and $C_b$ is extremely small compared to $R_b$, so that the addition of $L_a$ or $C_b$ has no substantial effect on the circuit parameters of the compensating circuit connected to the emitter or collector.

When the compensating circuit connected to the emitter consists of a parallel circuit of resistance and capacitor as in the circuits of FIG. 7 and FIG. 9, the decrease of the gain at high frequency regions can be achieved by a resistor R of such a value as has no substantial effect on the compensating circuit for the operating frequency band and is connected in series with the capacitor in the compensating circuit shown to the emitter as shown in phantom lines in the figures.

Among the various compensating circuits discussed in the foregoing, technical advantages of two typical circuits will be described in comparison with the prior-art circuit.

As has been mentioned earlier, in the prior-art circuit of FIG. 1, the amplitude distortion is 1.6 dB$(p-p)$. In contrast, in the circuit of FIG. 3 having $R_1 = 280$ ohms, $R_2 = 300$ ohms, $C_1 = 10$ picofarads and with an anti-oscillation resistor R having a resistance of 300 ohms connected in series with $C_1$, the amplitude distortion is only 0.4 dB$(p-p)$. Also, in the circuit of FIG. 7 having $R_1 = 280$ ohms, $R_2 = 300$ ohms and $L_a = 1.1$ microhenry, the amplitude distortion is 0.1 dB$(p-p)$.

As has been described in the foregoing, the addition of the compensating circuit of simple construction readily adapted to adjustment of involved circuit parameters to the conventional group-delay equalizer makes it possible to realize a group-delay equalizer, in which the amplitude distortion can be reduced even by using an inexpensive economical transistor of inferior $f_T$, $C_{ob}$ and other characteristics.

What is claimed is:

1. An active type group-delay equalizer, comprising:

- an input terminal and an output terminal;
- a transistor having its base connected to said input terminal of said equalizer;
- a first impedance element ($Z_1$) connected between the emitter of said transistor and a first reference potential point;
- a second impedance element ($Z_2$) connected between the collector of said transistor and a second reference potential point;
- a third impedance element ($Z_a$) connected between said emitter and said output terminal of said equalizer;
- a fourth impedance element ($Z_b$) connected between said collector and said output terminal;
- wherein said fourth impedance element ($Z_b$) is reactive, aid third impedance element ($Z_a$) is substantially resistive ($R_a$) and the condition $$Y_1 \approx Y_2\{1[=]\pm(1/h_{21})(1+2\,h_{11}Y_a)\}+(2/h_{21})(h_{22}+Y_a)$$

(where: $Y_1 = 1/Z_1$, $Y_2 = 1/Z_2$, $Y_a = 1/R_a$ and $h_{11}$, $h_{21}$ and $h_{22}$ are $h$-parameters of said transistor) is satisfied by said first impedance element ($Z_1$) or said second impedance element ($Z_2$) including a reactive component.

2. The active type group-delay equalizer according to claim 1 wherein said second impedance element ($Z_2$) is resistive and said first impedance element ($Z_1$) comprises a parallel circuit comprised of a resistor and capacitor.

3. The active type group-delay equalizer of claim 2 wherein said parallel circuit further includes a resistance means in series with said capacitor for reducing the gain of the equalizer at high frequencies.

4. The active type group-delay equalizer according to claim 2 wherein said third impedance element ($Z_a$) comprises a series circuit comprised of a resistor and inductor.

5. The active type group-delay equalizer of claim 4 wherein said parallel circuit further includes a resistance means in series with said capacitor for reducing the gain of the equalizer at high frequencies.

6. The active type group-delay equalizer according to claim 1 wherein said first impedance element ($Z_1$) is resistive and said second impedance element ($Z_2$) comprises a series circuit comprised of a resistor and inductor.

7. The active type group-delay equalizer according to claim 6 wherein said third impedance element ($Z_a$) comprises a series circuit comprised of a resistor and inductor.

8. An active type group-delay equalizer, comprising:

- an input terminal and an output terminal;
- a transistor having its base connected to said input terminal of said equalizer;
- a first impedance element ($Z_1$) connected between the emitter of said transistor and a first reference potential point;
- a second impedance element ($Z_2$) connected between the collector of said transistor and a second reference potential point;
- a third impedance element ($Z_a$) connected between said emitter and said output terminal of said equalizer;
- a fourth impedance element ($Z_b$) connected between said collector and said output terminal;
- wherein said third impedance element ($Z_a$) is reactive, said fourth impedance element ($Z_b$) is substantially resistive ($R_b$) and the condition $$Y_1 \approx Y_2\{1+(1/h_{21})(1-2h_{11}Y_b)\}+(2h_{22}/h_{21})$$

(where: $Y_1 = (1/Z_1)$, $Y_2 = (1/Z_2)$, $Y_b = (1/R_b)$ and $h_{11}$, $h_{21}$ and $h_{22}$ are $h$-parameters of said transistor) is satisfied by said first impedance element ($Z_1$) or said second impedance element ($Z_2$) including a reactive element.

9. The active type group-delay equalizer according to claim 8 wherein said second impedance element ($Z_2$) is resistive and said first impedance element ($Z_1$) comprises a parallel circuit comprised of a resistor and capacitor.

10. The active type group-delay equalizer of claim 9 wherein said parallel circuit further includes a resistance means in series with said capacitor for reducing the gain of the equalizer at high frequencies.

11. The active type group-delay equalizer of claim 9 wherein said fourth impedance element ($Z_b$) comprises a parallel circuit comprised of a resistor and capacitor.

12. The active type group-delay equalizer of claim 11 wherein said parallel circuit further includes a resistance means in series with said capacitor for reducing the gain of the equalizer at high frequencies.

13. The active type group-delay equalizer according to claim 8 wherein said third impedance element ($Z_a$) is reactive, said first impedance element ($Z_1$) is resistive and said second impedance element ($Z_2$) is comprised of a series circuit comprised of a resistor and an inductor.

14. The active type group-delay equalizer of claim 3 wherein said fourth impedance element ($Z_b$) comprises a parallel circuit comprised of a resistor and capacitor.

* * * * *